US011644438B2

(12) United States Patent
Okuno et al.

(10) Patent No.: US 11,644,438 B2
(45) Date of Patent: May 9, 2023

(54) CAPILLARY CARTRIDGE AND ELECTROPHORESIS APPARATUS

(71) Applicant: Hitachi High-Tech Corporation, Tokyo (JP)

(72) Inventors: Ayaka Okuno, Tokyo (JP); Motohiro Yamazaki, Tokyo (JP); Taro Nakazawa, Tokyo (JP); Mitsuhiro Miyazaki, Tokyo (JP); Ryusuke Kimura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 275 days.

(21) Appl. No.: 17/168,390

(22) Filed: Feb. 5, 2021

(65) Prior Publication Data

US 2021/0164937 A1 Jun. 3, 2021

Related U.S. Application Data

(63) Continuation of application No. 15/739,184, filed as application No. PCT/JP2015/069040 on Jul. 1, 2015, now Pat. No. 10,942,147.

(51) Int. Cl.
*G01N 27/447* (2006.01)

(52) U.S. Cl.
CPC . *G01N 27/44708* (2013.01); *G01N 27/44704* (2013.01)

(58) Field of Classification Search
CPC ....... G01N 27/44708; G01N 27/44704; G01N 27/44782; G01N 27/44743
See application file for complete search history.

(56) References Cited

U.S. PATENT DOCUMENTS

| 4,985,129 A | 1/1991 | Burd |
| 5,021,646 A | 6/1991 | Weinberger et al. |

(Continued)

FOREIGN PATENT DOCUMENTS

| CN | 202862056 U | 4/2013 |
| JP | 2-245654 A | 10/1990 |

(Continued)

OTHER PUBLICATIONS

Chinese-language Office Action issued in Chinese Application No. 202011430024.2 dated Oct. 24, 2022 with English translation (16 pages).

(Continued)

*Primary Examiner* — Gurpreet Kaur
(74) *Attorney, Agent, or Firm* — Crowell & Moring LLP

(57) ABSTRACT

A capillary cartridge achieves both improvement of attachability and improvement of heat dissipation performance for realizing short-time analysis. A heat dissipation body is provided between a capillary having a detection unit provided in a part thereof and a plate-like support body that supports the capillary, and temperature increase inside the capillary is suppressed by the heat dissipation body, and thereby, electrophoresis can be performed under a high voltage application condition where the amount of heat increases and analysis time is reduced. In addition, it is possible to redress complexity of an operation by reducing a fixing place at the time of attachment to only a detection unit and an electrode holder by using an integration structure in which the capillary, the supporting body, and the heat radiating body are integrated.

10 Claims, 12 Drawing Sheets

(56) References Cited

U.S. PATENT DOCUMENTS

| | | | |
|---|---|---|---|
| 5,364,521 A | 11/1994 | Zimmermann | |
| 2002/0003091 A1* | 1/2002 | Kojima | G01N 27/44704 204/603 |
| 2002/0023839 A1 | 2/2002 | Inaba et al. | |
| 2006/0219559 A1 | 10/2006 | Ugai et al. | |
| 2007/0205105 A1 | 9/2007 | Kawazoe et al. | |
| 2007/0278101 A1 | 12/2007 | Gomi et al. | |
| 2009/0183990 A1 | 7/2009 | Shoji et al. | |
| 2016/0216235 A1 | 7/2016 | Miyata et al. | |

FOREIGN PATENT DOCUMENTS

| | | |
|---|---|---|
| JP | 5-256820 A | 10/1993 |
| JP | 7-294486 A | 11/1995 |
| JP | 2001-242142 A | 9/2001 |
| JP | 2002-71642 A | 3/2002 |
| JP | 2004-85292 A | 3/2004 |
| JP | 2006-84411 A | 3/2006 |
| JP | 2006-284530 A | 10/2006 |
| JP | 2007-322367 A | 12/2007 |
| JP | 2009-174897 A | 8/2009 |

OTHER PUBLICATIONS

International Search Report (PCT/ISA/210) issued in PCT Application No. PCT/JP2015/069040 dated Sep. 29, 2015 with English translation (5 pages).

Japanese-language Written Opinion (PCT/ISA/237) issued in PCT Application No. PCT/JP2015/069040 dated Sep. 29, 2015 (4 pages).

Japanese-language Office Action issued in Japanese Application No. 2019-141993 dated Aug. 25, 2020 with English translation (six (6) pages).

German-language Office Action issued in German Application No. 11 2015 006 618.7 dated Nov. 7, 2022 with English translation (16 pages).

Maedler GmbH, "Federnde Druckstuecke Kunststoffausfuehrung", 2014. URL: http://www.maedler.de/product/1643/3/62/federnde-druckstuecke-kunststoffausfuehrung, archived at https://web.archive.org on Nov. 8, 2014 [retrieved Oct. 31, 2022].

* cited by examiner

[Fig. 1]
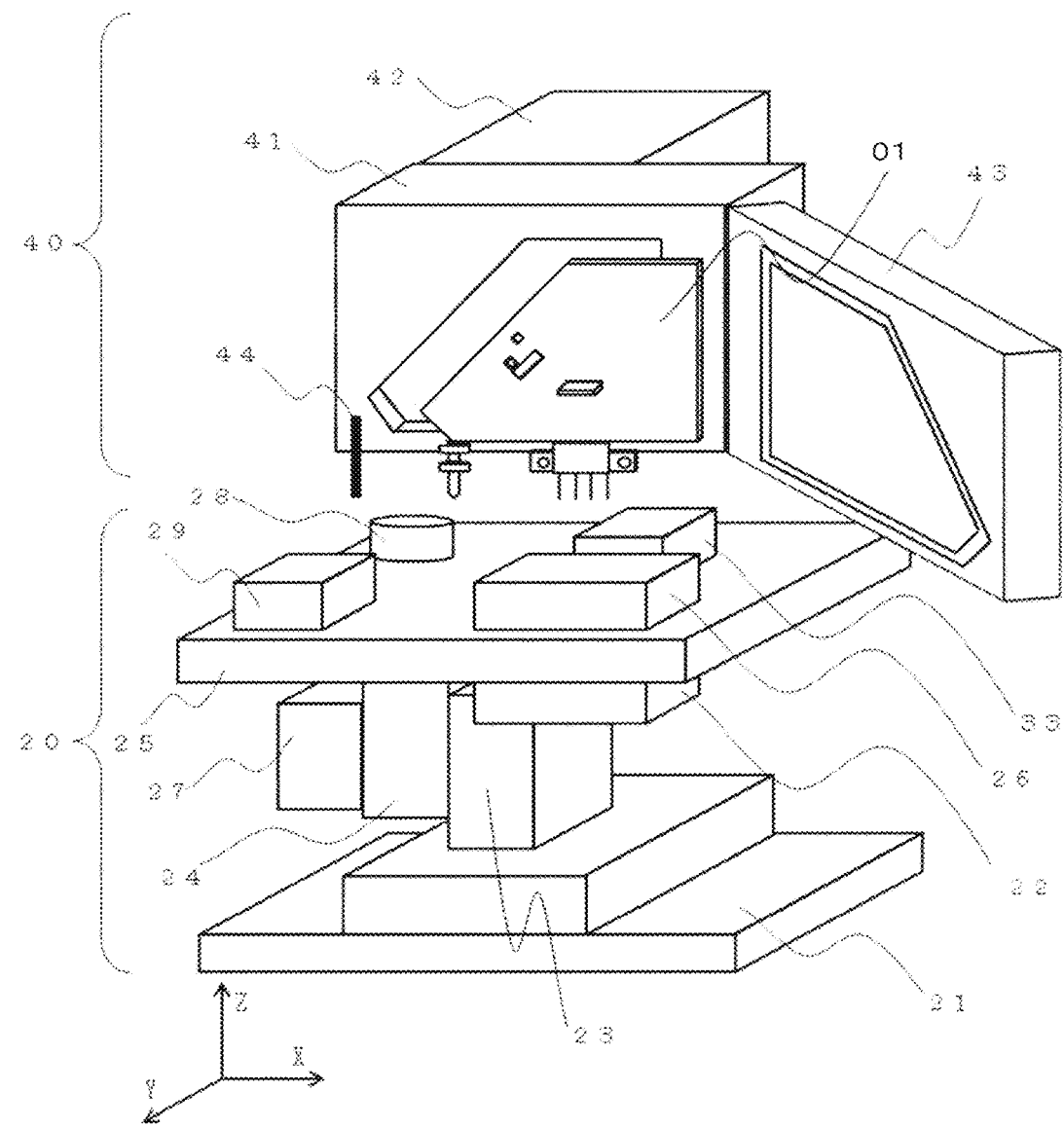

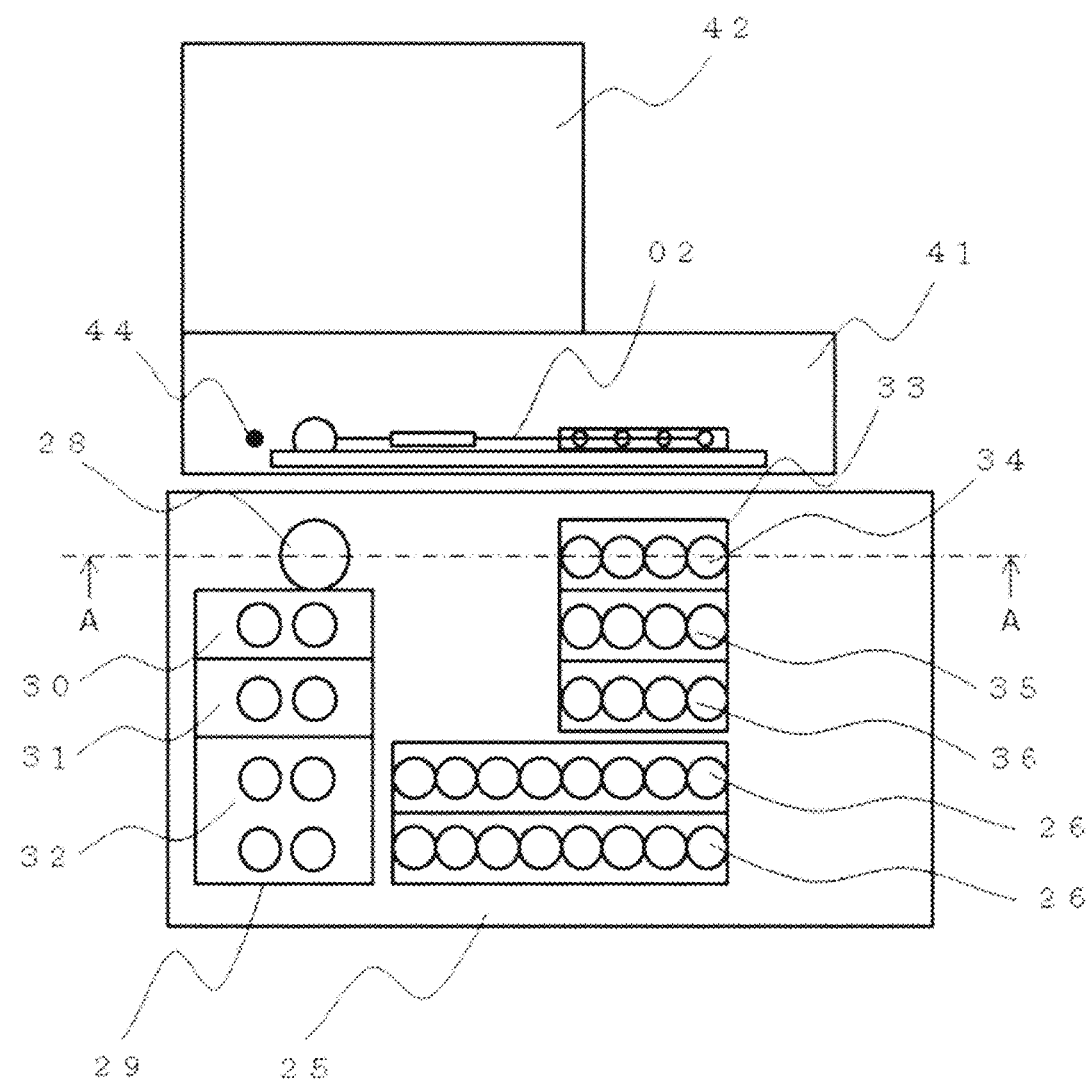
[Fig. 2]

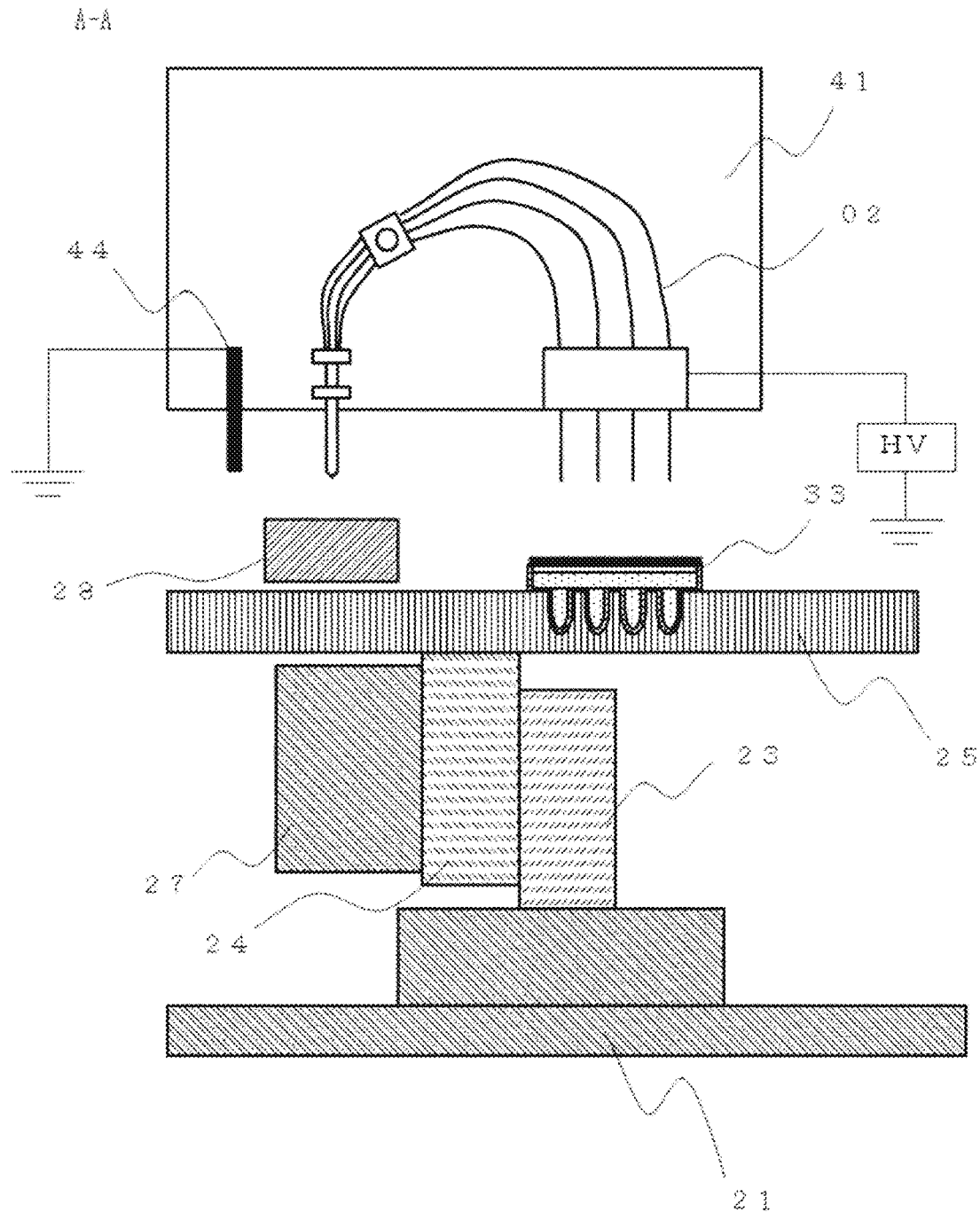
[Fig. 3]

[Fig. 4]
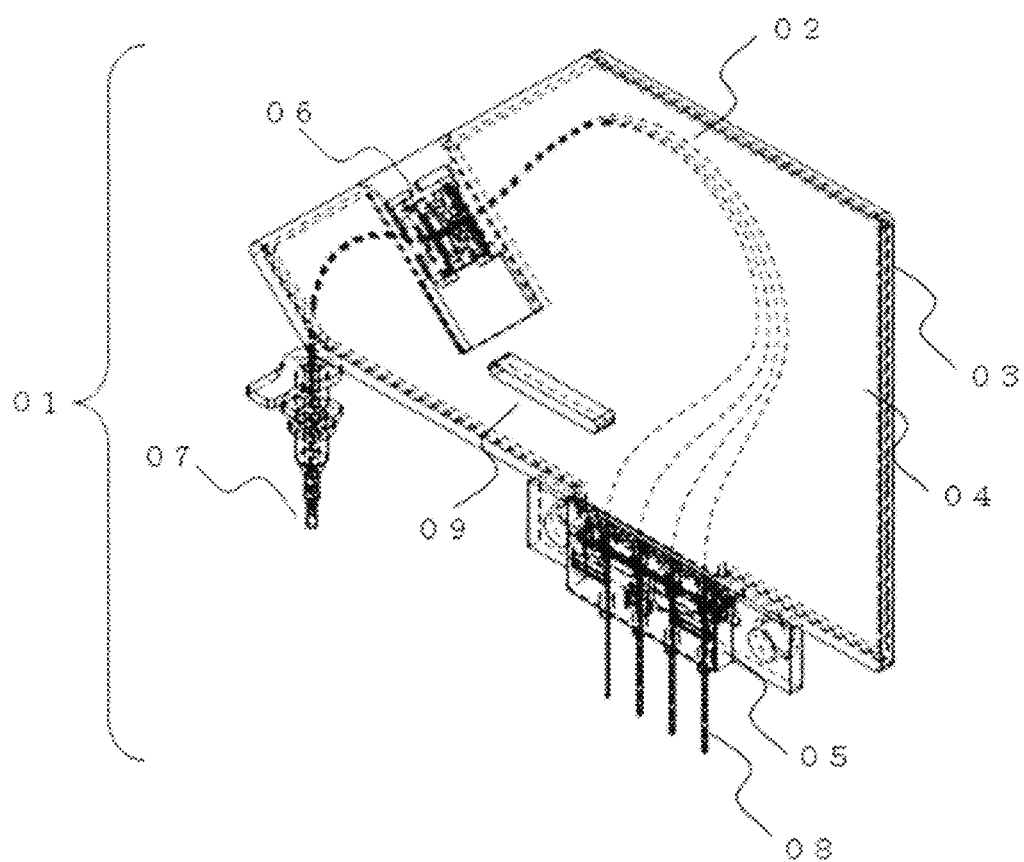

[Fig. 5]
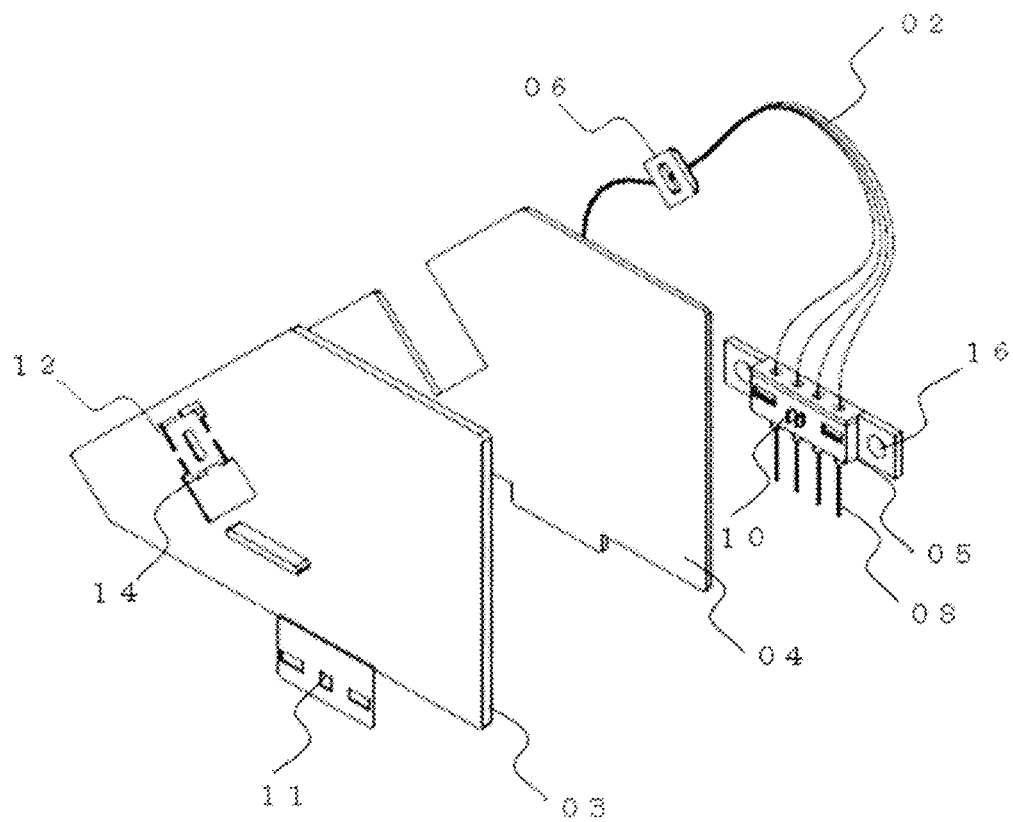
[Fig. 6]
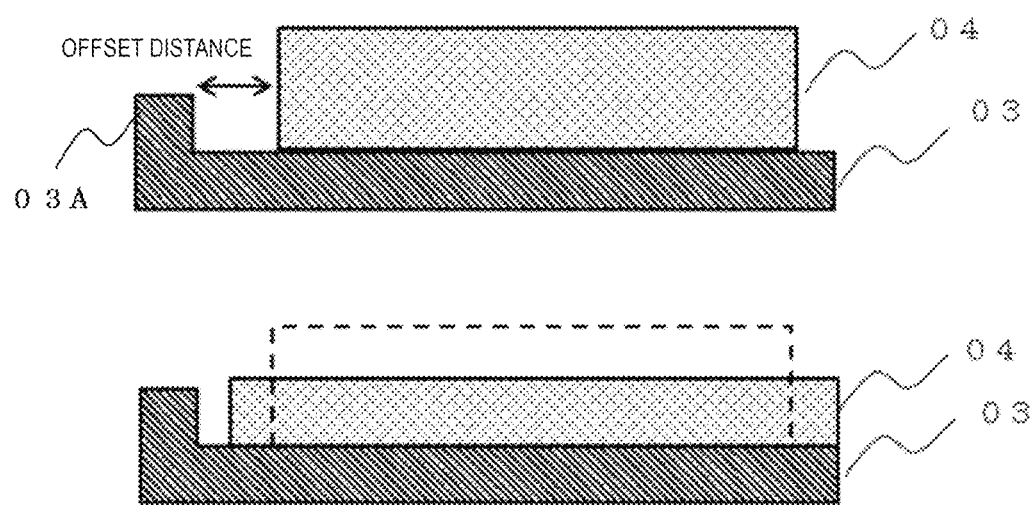

[Fig. 7]
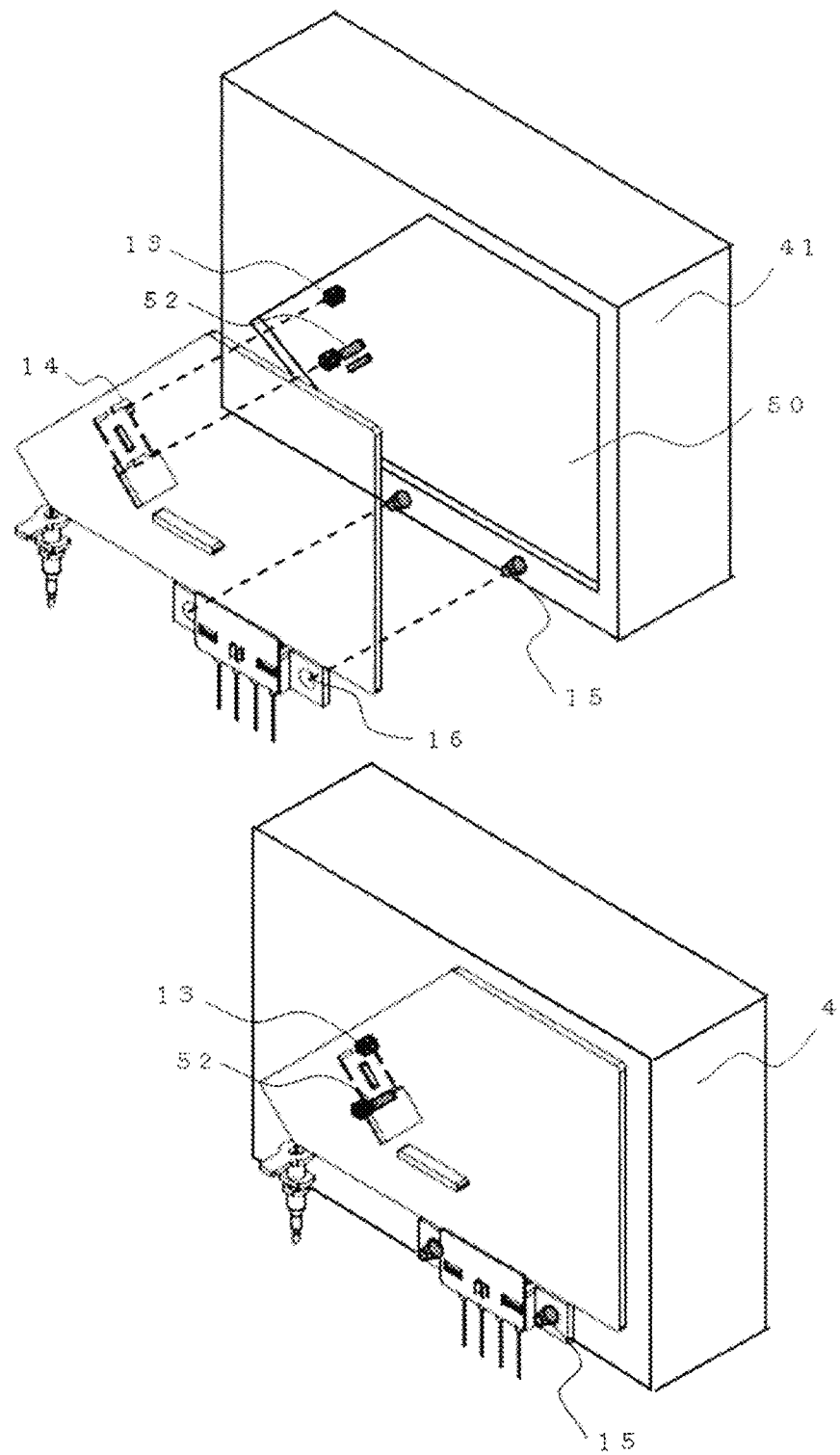

[Fig. 8]
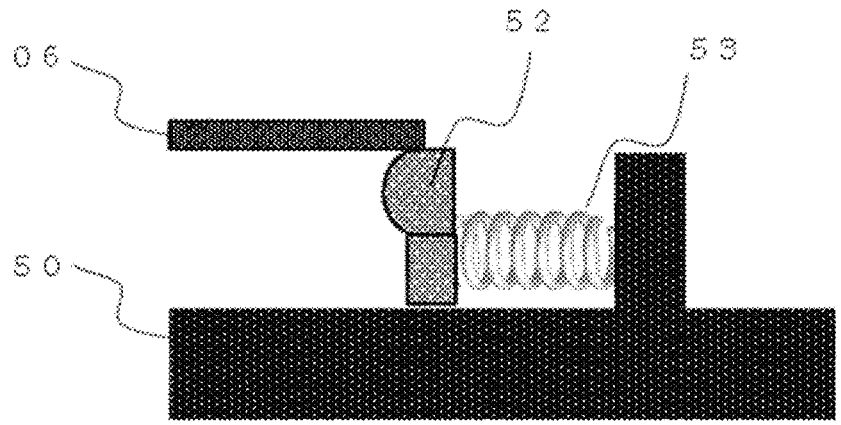
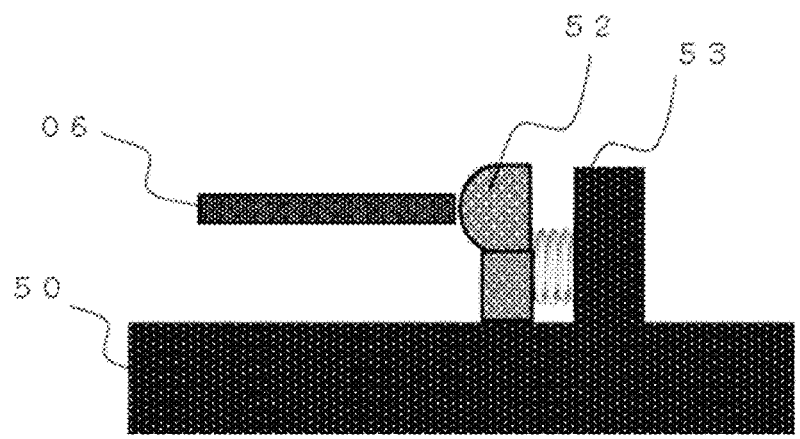
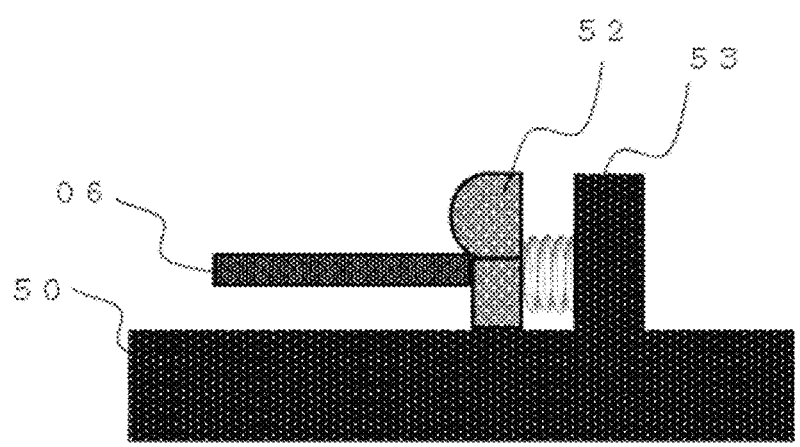

[Fig. 9]
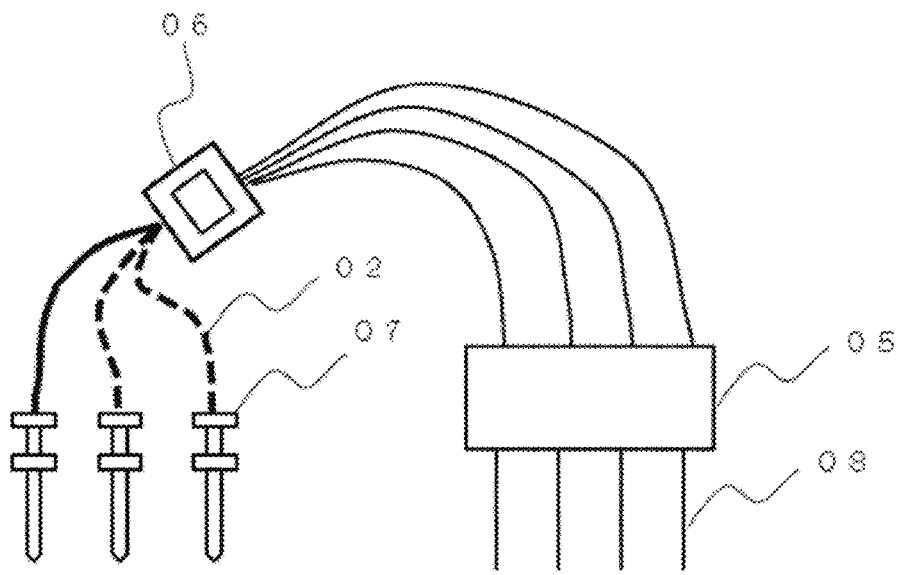
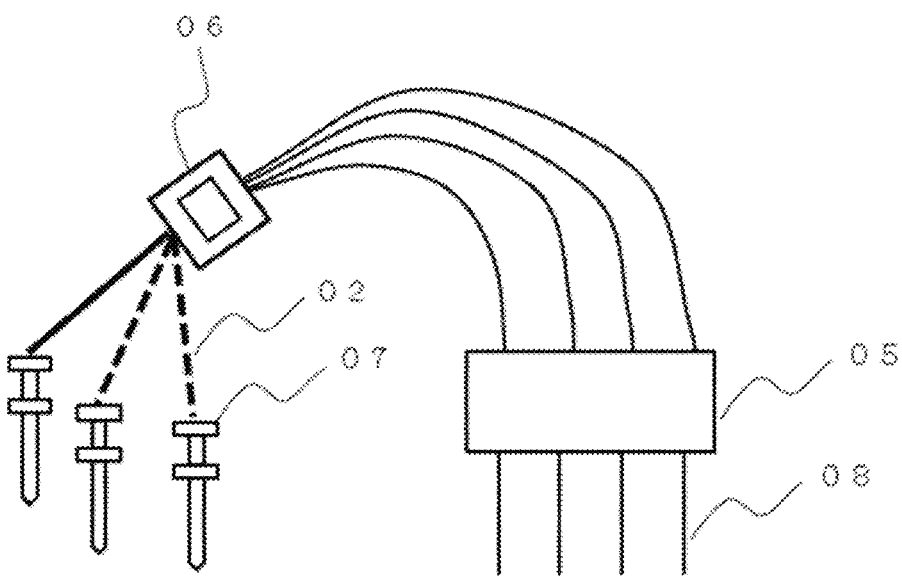

[Fig. 10]
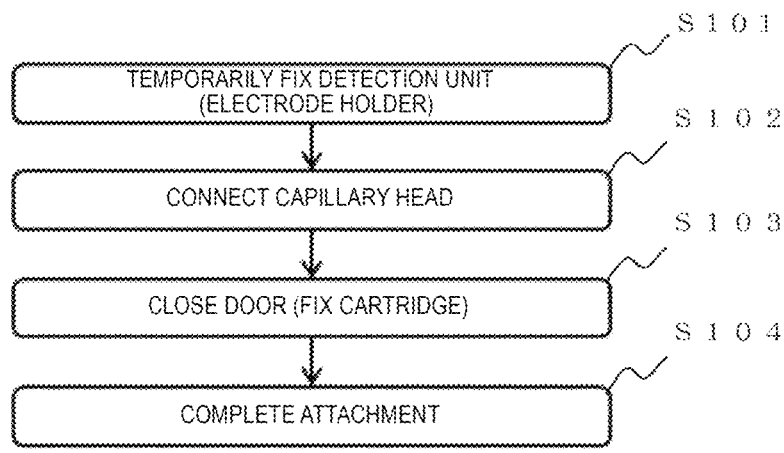
[Fig. 11]
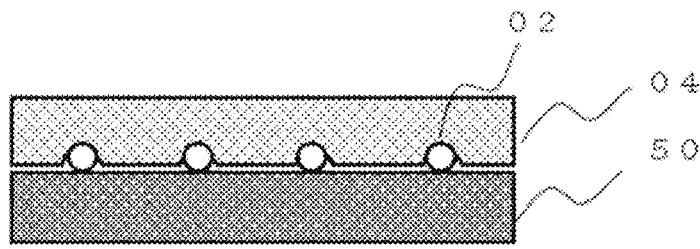
[Fig. 12]
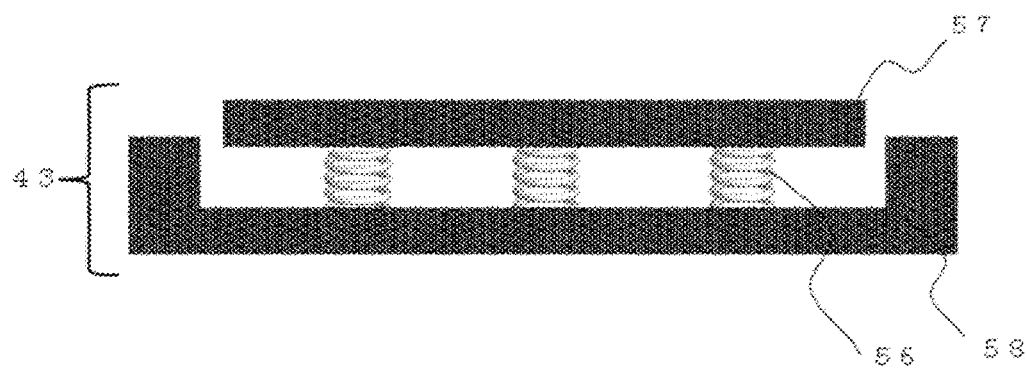

[Fig. 13]
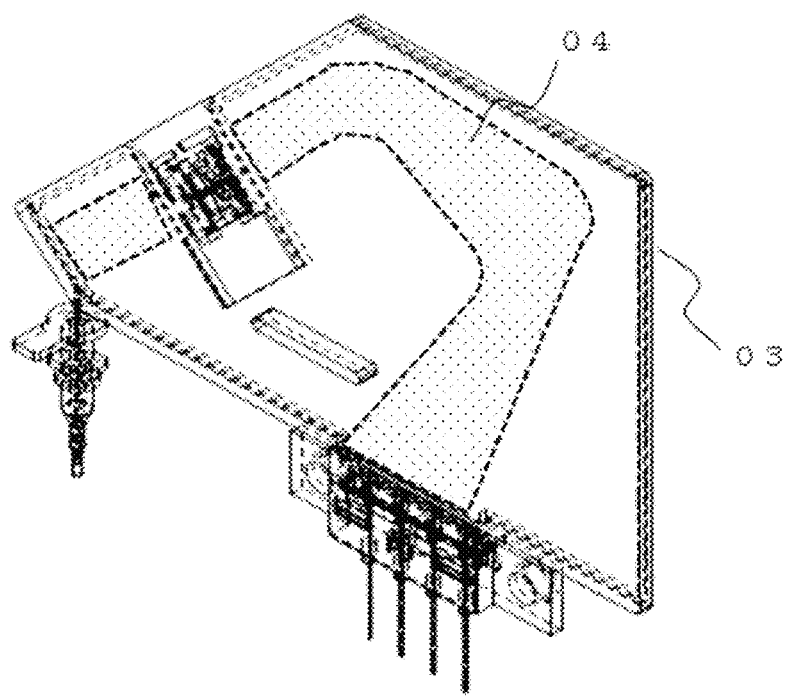

[Fig. 14]
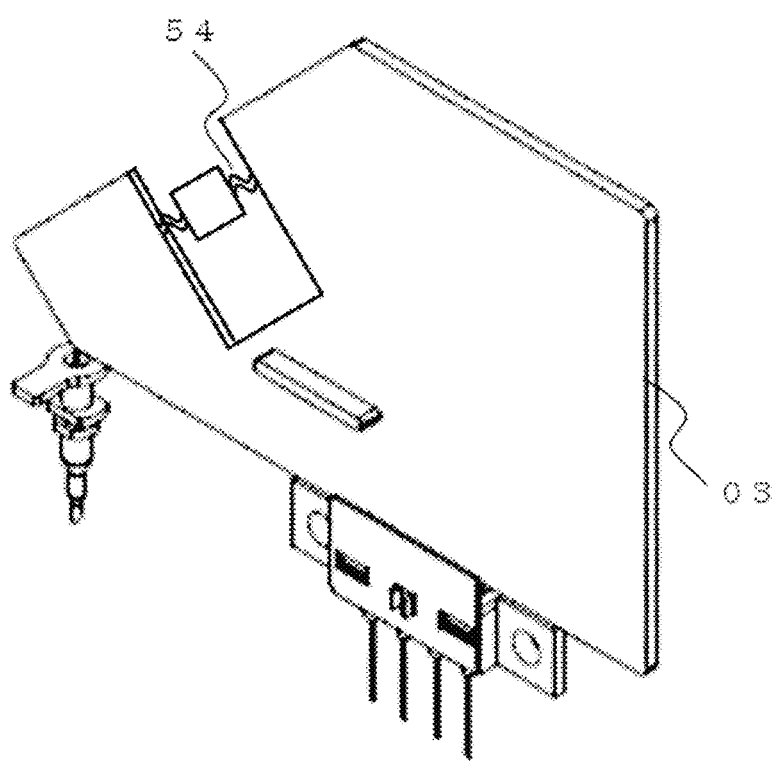

[Fig. 15]
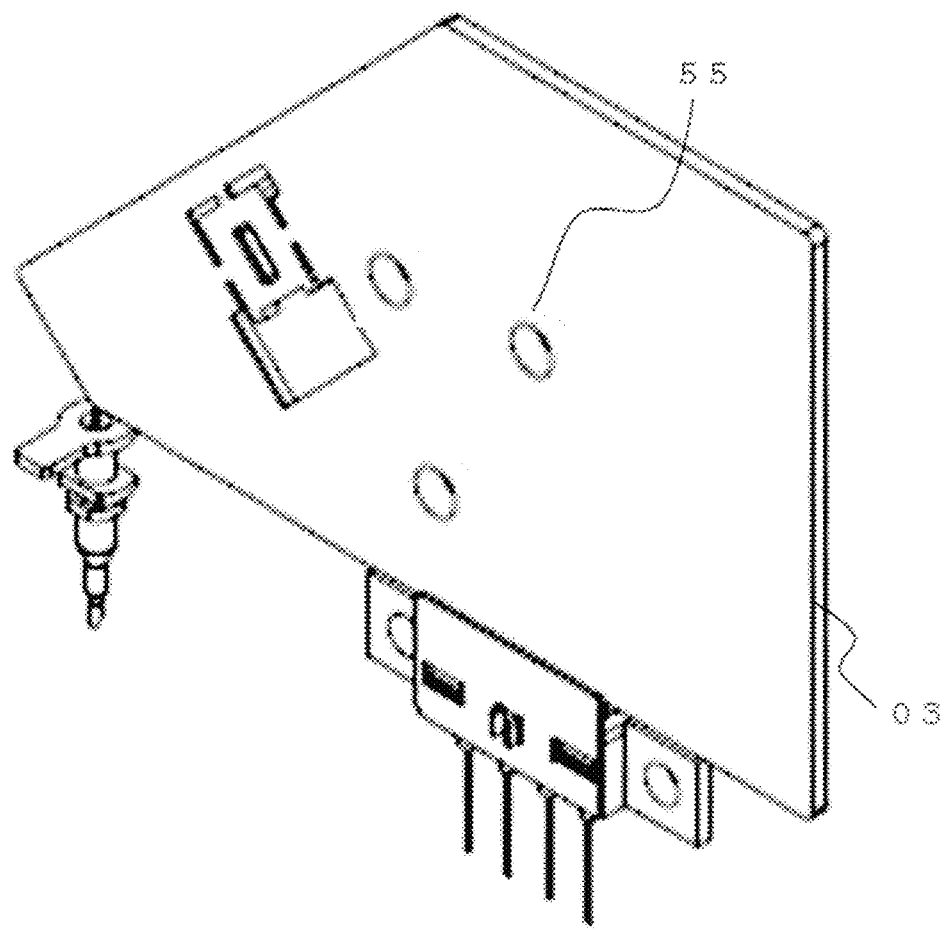
[Fig. 16]
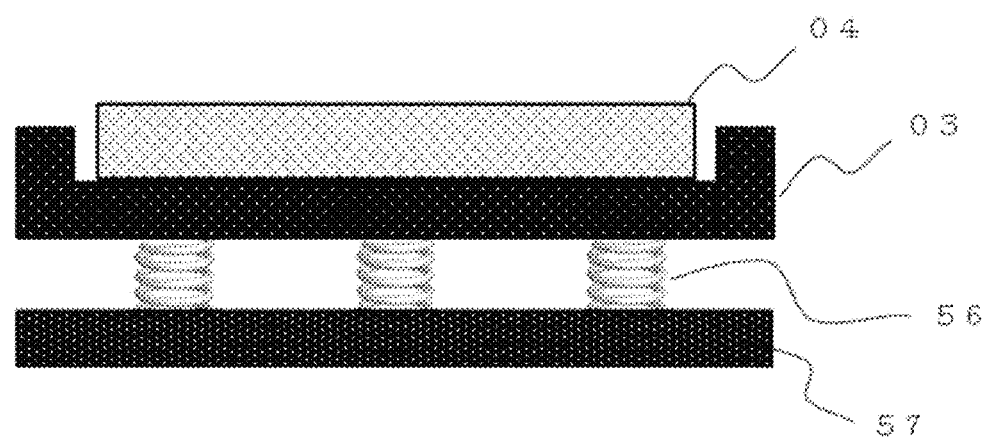

CAPILLARY CARTRIDGE AND ELECTROPHORESIS APPARATUS

CROSS REFERENCE TO RELATED APPLICATIONS

This application is a continuation of U.S. patent application Ser. No. 15/739,184, filed Dec. 22, 2017, which is a 371 of International Application No PCT/JP2015/069040, filed Jul. 1, 2015, the disclosures of all of which are expressly incorporated by reference herein.

TECHNICAL FIELD

The present invention relates to a capillary cartridge and an electrophoresis apparatus that uses the capillary cartridge, and particularly to a technology of improving attachability and heat dissipation.

BACKGROUND ART

Recently, DNA analysis has been rapidly expanding from a research application to a clinical field such as a hospital. There is a method of separating a DNA fragment by electrophoresis as means of the DNA analysis, and the DNA analysis is used for a criminal investigation, determination of a blood relationship, or a disease diagnosis.

In capillary electrophoresis, a capillary filled with a separation medium is maintained at a constant temperature and a high voltage is applied, and thereby, charged DNA is separated for each base length. A capillary is irradiated with excitation light and fluorescence emitted from the fluorescent dye label of DNA passing through the capillary is detected, and thereby, base sequence of a sample can be read. For example, Patent Documents 1 and 2 are related art documents relating to capillary electrophoresis.

Patent Document 1 discloses a capillary unit including a capillary, a frame for supporting the capillary, and a load header for holding a capillary cathode portion, and an electrophoresis apparatus that uses the capillary unit. The frame includes a separator for separating and holding the capillary, and can hold the capillary in a fixed shape as the capillary passes through the separator.

Patent Document 2 discloses an electrophoresis apparatus configured by a capillary, a support body in which a capillary is disposed on a surface, a heater for temperature control indirect contact with the capillary, an optical system, and a high-voltage power supply. By a structure in which the capillary is directly in contact with the heater, time required to increase temperature to a predetermined temperature can be shortened at the time of electrophoresis analysis.

CITATION LIST

Patent Literature

Patent Document 1: JP-A-2009-174897
Patent Document 2: JP-A-2006-284530

SUMMARY OF INVENTION

Technical Problem

Patent Document 1 provides a structure in which, when the capillary unit is attached, total three places of both end portions and a middle portion of the capillary of a detection unit are separately attached, and furthermore, it is necessary to close a cover or the like at each place, at least six steps are required, and an operation of a user is complicated. In addition, since only a part of the capillary is held by the frame, there is a risk of being damaged by applying excessive force at the time of attachment.

Patent Document 2 provides a structure in which the capillary is directly interposed between the heater and the support body. Accordingly, a structure is not provided in which, at the time of electrophoresis analysis, heat generated from the capillary is positively diffused when a high voltage is applied to both ends of the capillary. If the capillary is shortened to reduce an analysis time, the total resistance value of the capillary decreases and a flowing current increases, and thereby, the amount of heat generated from the capillary increases. Thus, if the structure does not positively diffuse the heat, the heat of the capillary cannot be dissipated, and an internal temperature of the capillary becomes higher than the predetermined temperature. As a result, electrophoresis speed of a sample becomes unstable, and separation performance decreases. Therefore, the time required for electrophoresis analysis cannot be reduced by the structure.

An object of the present invention is to provide a capillary cartridge and an electrophoresis apparatus which solve the above-described problems and improve heat dissipation performance for realizing improvement of attachability of a capillary and short time analysis.

Solution to Problem

In order to achieve the above-described object, the present invention provides a capillary cartridge which uses an electrophoresis apparatus including a capillary, a support body that supports the capillary, a capillary head that bundles one end of the capillary, an electrode that is provided in the other end of the capillary, a detection unit that is provided in a part of the capillary, and a heat dissipation body that is provided between the capillary and the support body.

In addition, In order to achieve the above-described object, the present invention provides an electrophoresis apparatus including a capillary cartridge having a capillary, a support body that supports the capillary, a capillary head that bundles one end portion of the capillary, an electrode that is provided in the other end portion of the capillary, a detection unit that is provided in a part of the capillary, and a heat dissipation body that is provided between the capillary and the support body, a thermostatic bath that holds the capillary at a predetermined temperature, an injection mechanism that injects an electrophoresis medium into the capillary, and an irradiation detection portion that performs irradiation and detection of light at the time of electrophoresis by using the capillary.

Advantageous Effects of Invention

According to the present invention, temperature increase inside the capillary can be suppressed by a heat dissipation body, and thus, it is possible to perform electrophoresis under a high voltage application condition in which the amount of heat increases and to reduce analysis time. In addition, it is possible to improve complexity of an operation by reducing the number of fixing places at the time of attachment by adopting a structure in which a capillary and a support body are integrated. Thereby, it is possible to improve analysis performance and to improve usability.

BRIEF DESCRIPTION OF DRAWINGS

FIG. 1 is a schematic view illustrating a configuration of a capillary electrophoresis apparatus according to embodiment 1.

FIG. 2 is a top view of the capillary electrophoresis apparatus according to embodiment 1.

FIG. 3 is a cross-sectional view taken along a line A-A of the capillary electrophoresis apparatus according to embodiment 1.

FIG. 4 is a view illustrating a configuration of a capillary cartridge according to embodiment 1.

FIG. 5 is an exploded view of the capillary cartridge according to embodiment 1.

FIG. 6 is a sectional view illustrating an example of a support body and a heat dissipation body according to embodiment 1.

FIG. 7 is a view illustrating attachment of the capillary cartridge according to embodiment 1.

FIG. 8 is a sectional view illustrating an operation of a clip according to embodiment 1.

FIG. 9 is a view illustrating an adjustment margin of the capillary according to embodiment 1.

FIG. 10 is a work flowchart of attachment of the capillary cartridge according to embodiment 1.

FIG. 11 is a sectional view illustrating a peripheral portion of the capillary according to embodiment 1.

FIG. 12 is a sectional view illustrating an example of a thermostatic bath door according to embodiment 1.

FIG. 13 is a view illustrating a configuration of a capillary cartridge according to embodiment 2.

FIG. 14 is a view illustrating a configuration of a capillary cartridge according to embodiment 3.

FIG. 15 is a view illustrating a configuration of a support body according to embodiment 4.

FIG. 16 is a sectional view illustrating a configuration of a support body according to embodiment 5.

DESCRIPTION OF EMBODIMENTS

Hereinafter, various embodiments of the present invention will be described with reference to the drawings. In all the drawings illustrating various embodiments, those having the same function are denoted by the same reference numerals or symbols.

Embodiment 1

Embodiment 1 is an embodiment of a capillary cartridge for improving heat dissipation performance for improving attachability and shortening time analysis, and an electrophoresis apparatus which uses the capillary cartridge. That is, Embodiment 1 is an embodiment of an electrophoresis apparatus including a capillary cartridge having a capillary, a plate-like support body that supports the capillary, a capillary head that bundles one end portion of the capillary, an electrode that is provided in the other end portion of the capillary, a detection unit that is provided in a part of the capillary, and a heat dissipation body that is provided between the capillary and the support body; a thermostatic bath that holds the capillary at a predetermined temperature; an injection mechanism that injects an electrophoresis medium into the capillary; and an irradiation detection portion that performs irradiation and detection of light at the time of electrophoresis by using the capillary.

Hereinafter, configurations and dispositions of the capillary cartridge according to embodiment 1 and an electrophoresis apparatus which uses the capillary cartridge, and an attachment method will be described with reference to FIG. 1 to FIG. 9. FIG. 1 illustrates an apparatus configuration view of a capillary electrophoresis apparatus according to embodiment 1. The present apparatus can be roughly divided into two units: an irradiation detection/thermostatic bath unit 40 at the top of the apparatus and an autosampler unit 20 at the bottom of the apparatus.

In the autosampler unit 20 which is an injection mechanism described above, a Y-axis drive body 23 is mounted on a sampler base 21, and can be driven on the Y axis. A Z-axis drive body 24 is mounted on the Y-axis drive body 23, and can be driven on the Z axis. A sample tray 25 is mounted on the Z-axis drive body 24, and a user sets an electrophoresis medium container 28, an anode side buffer liquid container 29, a cathode side buffer liquid container 33, and a sample container 26 on the sample tray 25. The sample container 26 is set on the X-axis drive body 22 mounted on the sample tray 25, and only the sample container 26 can be driven to the X axis on the sample tray 25. A liquid feeding mechanism 27 is also mounted on the Z-axis drive body 24. The liquid feeding mechanism 27 is disposed below the electrophoresis medium container 28.

The irradiation detection/thermostatic bath unit 40 includes a thermostatic bath unit 41 which is the above-mentioned thermostatic bath and a thermostatic bath door 43, and can maintain an inside temperature at a constant temperature. An irradiation detection unit 42 which is the irradiation detection portion is mounted behind the thermostatic bath unit 41, and can perform detection at the time of electrophoresis. A user sets a capillary cartridge 01 which will be described in detail below in the thermostatic bath unit 41, the electrophoresis is performed while the capillary is maintained at a constant temperature in the thermostatic bath unit 41, and detection is performed by the irradiation detection unit 42. In addition, an electrode (anode) 44 is also mounted on the thermostatic bath unit 41 so as to drop a high voltage to GND when the high voltage for electrophoresis is applied.

As described above, the capillary cartridge 01 is fixed to the thermostatic bath unit 41. The electrophoresis medium container 28, the anode side buffer liquid container 29, the cathode side buffer liquid container 33, and the sample container 26 can be driven to the YZ axis by the autosampler unit 20, and only the sample container 26 is further driven to the X axis. The electrophoresis medium container 28, the anode side buffer liquid container 29, the cathode side buffer liquid container 33, and the sample container 26 can be automatically connected to an arbitrary position by movement of the autosampler unit 20, in the capillary of the fixed capillary cartridge 01.

FIG. 2 illustrates a view, which is viewed from the top, of the capillary electrophoresis apparatus illustrated in FIG. 1. The anode side buffer liquid container 29 set on the sample tray 25 includes an anode side wash layer 30, an anode side electrophoresis buffer liquid layer 31, and an anode side sample introduction buffer liquid layer 32. In addition, the cathode side buffer liquid container 33 includes a waste liquid layer 34, a cathode side wash layer 35, and a cathode side electrophoresis buffer liquid layer 36.

The electrophoresis medium container 28, the anode side buffer liquid container 29, the cathode side buffer liquid container 33, and the sample container 26 are arranged in a positional relationship as illustrated. Thereby, a positional relationship of anode side-cathode side at the time of connection with a capillary 02 of the capillary cartridge in the thermostatic bath unit 41 becomes "electrophoresis medium container 28-waste liquid layer 34", "anode side wash layer 30-cathode side wash layer 35", "anode side electrophoresis buffer liquid layer 31-cathode side electrophoresis buffer liquid layer 36", and "anode side sample introduction buffer liquid layer 32-sample container 26".

FIG. 3 is a cross-sectional view taken along a line A-A of FIG. 2. The electrophoresis medium container 28 is set in the sample tray 25. In addition, the liquid feeding mechanism 27 is disposed such that a plunger embedded in the liquid feeding mechanism 27 is located below the electrophoresis medium container 28.

At the time of electrophoresis, the right side of the capillary 02 in FIG. 3 becomes a cathode side, and the left side becomes an anode side. The autosampler unit 20 moves to a location of "anode side electrophoresis buffer liquid layer 31-cathode side electrophoresis buffer liquid layer 36", a high voltage is applied to the capillary 02 on the cathode side, and a current flows from the electrode (anode) 44 to GND through the cathode side buffer liquid container 33 and the anode side buffer liquid container 29, and thereby, electrophoresis is performed. An apparatus structure may be provided in which a location of the sample tray 25 is fixed and the irradiation detection/thermostatic bath unit 40 is operated.

FIG. 4 illustrates a schematic view of a configuration of the capillary cartridge according to the present embodiment. The capillary cartridge 01 is configured with the capillary 02, a support body 03, a heat dissipation body 04, an electrode holder 05, a detection unit 06, a capillary head 07, an electrode (cathode) 08, and a handle 09 as a grip portion. In addition, the electrode (cathode) 08 may be directly fixed to the support body 03. In FIG. 4, the capillary cartridge 01 is arranged in the order of the support body 03 having the handle 09, the heat dissipation body 04, and the capillary 02 from the front side of FIG. 4.

The capillary head 07 is an end portion of the capillary 02, and is an injection end or a discharge end that holds the capillary 02 in a bundle and fills the electrophoresis medium. In the present embodiment, when the capillary cartridge 01 is attached to the electrophoresis apparatus, the capillary head 07 is connected to a container storing the electrophoresis medium, and thereby, the capillary cartridge functions as an injection end. The capillary head is installed in a state of being bent in the electrophoresis apparatus.

FIG. 5 illustrates an exploded view of the capillary cartridge in the present embodiment illustrated in FIG. 4. The heat dissipation body 04 is attached to the support body 03 by the adhesiveness or tackiness of the heat dissipation body 04, chemical adhesion, a physical attachment mechanism, or the like. In addition, the capillary 02 has an integral structure by attaching the electrode holder 05 and the detection unit 06 to the support body 03. The electrode holder 05 holds an electrode (cathode) 08, and has a structure in which an electrode holder fixing pin 10 formed in the electrode holder 05 passes through the electrode holder fixing hole 11 of the support body 03 thereby being fixed to the support body 03. In addition, the support body 03 includes a detection unit fixing frame 12 for fixing the detection unit 06, and the detection unit 06 is fixed to the support body 03 by being fit into the detection unit fixing frame 12 formed in the support body 03. Numeric signs 14 and 16 are a positioning hole into which a detection unit positioning pin is inserted, and an electrode holder positioning hole, respectively.

The capillary 02 is a stagnant flow channel coated with a coating for maintaining light shielding and a strength, and is, for example, a quartz glass tube that has an inner diameter of approximately 50 μm and is coated with polyimide. The tube is filled with electrophoresis medium, thereby, becoming an electrophoresis path separating a sample. Since the capillary 02 and the heat dissipation body 04 are in close contact with each other, heat generated from the capillary 02 at the time of applying a high voltage can be released to the support body 03 side by the heat dissipation body 04, and a temperature inside the capillary 02 can be prevented from increasing.

The electrode (cathode) 08 exists in correspondence with the number of the capillaries 02, a charged sample can be introduced into the capillary 02 by applying a voltage, and thereby, electrophoresis separation can be performed for each molecular size. The electrode (cathode) 08 is a stainless steel pipe having an inner diameter of, for example, approximately 0.1 to 0.5 m, and the capillary 02 is inserted therein.

The detection unit 06 is located at an intermediate portion of the capillary 02, and the capillaries 02 are arranged in a planar manner with constant accuracy. The detection unit 06 is a portion for detecting fluorescence of a sample passing through the capillary 02, and it is necessary to perform positioning with high accuracy with respect to a location of a detection system of a device.

FIG. 6 illustrates a sectional view of the support body 03 and the heat dissipation body 04 of the capillary cartridge according to the present embodiment. The heat dissipation body 04 is, for example, a soft silicon rubber with heat dissipation performance and insulation performance, which increases a contact area with the capillary by deformation of the rubber, and thereby, heat dissipation effects increase and the capillary can be prevented from being damaged by a cushion property. A soft member such as a rubber is collapsed and deformed when a load is applied, and a contact area with the capillary decreases, or an air layer is formed to prevent heat conduction, and thereby, a shape and the amount of deformation need to be controlled depending on hardness.

The support body 03 of the capillary cartridge according to the present embodiment has a box-shaped structure, and the heat dissipation body 04 is limited so as not to be deformed to a certain size or more in a planar direction by a protrusion portion 03A which is provided on an outer peripheral portion of the support body 03 and protrudes toward the heat dissipation body 04. In addition, by providing a gap between an end portion of the heat dissipation body 04 and the outer peripheral portion of the support body 03, that is, by designing an offset distance to the protrusion portion 03A of the support body 03 in consideration of an elastic modulus of the heat dissipation body 04, it is possible to prevent the heat dissipation body 04 from protruding beyond the protrusion portion 03A to be deformed. In addition, a height of the protrusion portion 03A of the support body 03 is smaller than a thickness of the heat dissipation body 04, and thereby, even if a load is applied, the heat dissipation body 04 is not collapsed beyond the height of the support body 03. Accordingly, it is possible to reliably make the heat dissipation body 04 come into contact with a device surface to which the capillary cartridge is attached. For example, if silicon rubber with thermal conductivity of 0.1 to 5 W/m·K is used for the heat dissipation body 04, heat dissipation performance of 200 W/m²·K or more can be obtained. Various rubbers other than silicon, an elastomer, a heat dissipation gel, or the like may be used for the heat dissipation body 04.

FIG. 7 illustrates an example of a detailed view of attachment of the capillary cartridge according to the present embodiment. If a detection unit positioning pin 13 is attached to an attachment surface 50 on the thermostatic bath unit 41 side of the electrophoresis apparatus and is pushed through a positioning hole 14 of the support body 03, the detection unit 06 is temporarily fixed by a clip 52. At the same time, since a taper-shaped electrode holder positioning pin 15 on the thermostatic bath unit 41 of a device to be attached is automatically inserted into an electrode holder positioning hole 16 of the support body 03, the capillary cartridge 01 is temporarily fixed to the thermostatic bath unit 41 by a one-time operation. The electrode holder positioning pin 15 and the electrode holder positioning hole 16 may be attached to opposite positions. That is, the electrode holder and the support body can be fixed by making the electrode holder positioning pin provided on one side pass through the electrode holder positioning hole provided on the other side.

FIG. 8 illustrates a sectional view of the clip 52. A structure is provided in which, if the capillary cartridge 01 approaches the attachment surface 50, and if the detection unit 06 hits a projection portion of the clip 52 so as to push the clip 52 once and further approaches as illustrated in an upper stage of the figure, the detection unit 06 crosses over the projection portion of the clip 52, the clip 52 presses the detection unit 06 by reaction force of a spring 53, and the clip 52 temporarily fixes the detection unit 06 as illustrated in an intermediate stage and a lower stage of the figure. At this time, at the same time when the detection unit crosses over the projection portion, the clip 52 is instantaneously moved by the reaction force, and thereby, click sound is made, and a user can confirm that the capillary cartridge 01 is temporarily fixed.

In this way, according to the present embodiment, positioning is first performed from the detection unit 06, and thereby, the detection unit 06 and an optical system of the electrophoresis apparatus can be reliably positioned with high accuracy. In addition, by making the electrode holder positioning pin 15 have a tapered shape as illustrated in FIG. 7, even if a location of the electrode holder positioning pin 15 is shifted to some extent for each device, the electrode holder positioning pin is reliably inserted into the electrode holder positioning hole 16, and thereby, the electrode holder 05 can also be temporarily fixed if a location of the detection unit 06 is determined. Accordingly, since a user can perform a series of an attachment operation of the capillary cartridge 01 with the handle 09 which is a grip portion, it is possible to operate without touching the detection unit 06 with a hand or forcibly bending the capillary 02, and thereby, usability can be improved and a damage risk can be reduced.

FIG. 9 illustrates a detailed view of adjustment margin of the capillary of the capillary cartridge according to the present embodiment. In order to fill the capillary 02 with an electrophoresis medium, the capillary head 07 and the electrophoresis medium container 28 are connected to each other when the capillary cartridge 01 is attached, but, at this time, a location of the capillary head 07 has to be moved according to a location of the electrophoresis medium container 28. This is because, if heights of the capillary head 07 and a tip portion of the electrode (cathode) 08 are not aligned, a siphon phenomenon occurs in which the electrophoresis medium in the capillary 02 moves, and thereby, the heights need to be aligned with high accuracy.

As illustrated in a lower stage of the figure, if a length of the capillary 02 from the detection unit 06 to the capillary head 07 is designed to be the shortest distance to a polymer container such as the electrophoresis medium container 28, when a location of the polymer container is shifted by a device, the capillary head 07 moves to the left and right, and thereby, the height is also changed. In the present embodiment, as illustrated in an upper stage of the figure, the capillary 02 is designed to have a length obtained by adding the adjustment margin to the shortest distance from the detection unit 06 to the polymer container, and, even if the capillary head 07 moves in the left-right direction, it is possible to maintain as is aligned at the same height as the tip portion of the electrode (cathode) 08.

If the capillary head 07 moves in a state where the capillary cartridge 01 is completely fixed, there is a risk of abrasion of the heat dissipation body 04 or excessive force being applied to the capillary 02, and thus, the present embodiment provides a structure in which the capillary cartridge 01 is temporarily fixed once before the capillary head 07 is connected. As illustrated in FIG. 8, since the detection unit 06 is held in perpendicular direction of the cartridge by the projection portion of the clip 52 and in a planar direction of the cartridge by the reaction force of the spring 53 of the clip 52, a structure is provided in which the detection unit is not deviated by a tension possessed by the capillary 02 and the capillary cartridge 01 does not come off as a user moves the capillary head 07.

Then, after the capillary head 07 is connected to the electrophoresis medium container 28, the capillary cartridge 01 is pressed by the thermostatic bath door 43 illustrated in FIG. 1, and thereby, the detection unit 06 is fixed by pushing the clip 52. At the same time, the electrode holder positioning pin 15 is deeply inserted into the electrode holder positioning hole 16, and thereby the entire capillary cartridge 01 is completely fixed. At this time, as the detection unit positioning pin 13 is deeply inserted, a click sound is made and thus, a user can confirm that the capillary cartridge 01 is completely fixed. The click sound may be made by using the same structure as the clip 52 for a fixing portion of the electrode holder 05.

FIG. 10 illustrates a work flow of attachment of the capillary cartridge 01 according to the present embodiment. First, the detection unit 06 is temporarily fixed, and at the same time, the electrode holder 05 is temporarily fixed (S101). Next, the capillary head 07 and the electrophoresis medium container 28 are connected to each other (S102), and finally, the thermostatic bath door 43 is closed, and thereby, the capillary cartridge 01 is pushed in and fixed (S103) and the attachment is completed (S104). As such, by fixing one place, the entire structure is also fixed automatically, a procedure can be reduced, and complexity of attachment of the capillary 02 can be reduced.

FIG. 11 illustrates a sectional view of a peripheral portion of the capillary 02 according to the present embodiment. If, for example, silicone rubber is used as the heat dissipation body 04, when a predetermined load is applied by making the capillary cartridge 01 come into contact with the attachment surface 50 on the electrophoresis apparatus side, the heat dissipation body 04 is deformed along a shape of the capillary 02, and thereby, a contact area with the capillary 02 can be increased. At this time, a uniform load is uniformly applied to the entire surface of the heat dissipation body 04 by a door, and thereby, it is difficult to form an air layer between the attachment surface 50 and the heat dissipation body 04. In contrast to this, if the air layer completely disappears, there is a possibility that the heat dissipation body 04 becomes like a suction cup and the capillary cartridge 01 cannot be detached. In the present embodiment, an integral structure having the capillary 02 interposed therebetween is provided, the capillary 02 is disposed to an external side of the heat dissipation body 04, and the air layer does not completely disappear. Accordingly, it is possible to simply detach without sticking to the attachment surface 50.

FIG. 12 illustrates a structure example of a thermostatic bath door according to the present embodiment, and the thermostatic bath door has a two-stage structure having an elastic body such as a spring interposed therebetween. That is, the thermostatic bath door 43 has a two-stage structure in which a push plate 57 is attached to a door support body 58 through one or more push plate spring 56, and has a cushion property. By adjusting a spring constant, it is possible to control the load applied to the capillary cartridge 01 when the thermostatic bath door 43 is closed. For example, if twelve springs 53 with a spring constant of 3 N/mm are used, a load of 30 N can be applied when the thermostatic bath door 43 is closed.

As a heat dissipation body between a capillary including a detection unit provided in a part thereof and a plate-shaped support body for supporting the capillary is provided by the capillary cartridge according to embodiment 1 described in detail above, temperature increase inside the capillary can be suppressed by the heat dissipation body, and thereby, it is possible to perform electrophoresis under a high voltage application condition where the amount of heat increases and to reduce the analysis time. In addition, it is possible to improve complexity of an operation by reducing the number of fixing places at the time of attachment by adopting a structure in which the capillary, the support body, and the heat dissipation body are integrated.

Furthermore, in the present embodiment, an integral structure is provided in which the detection unit and the cathode electrode portion of the capillary are held in the support body, two places of the support body and the anode electrode portion of the capillary are fixed and the entire capillary cartridge is pushed to a door mechanism of the electrophoresis apparatus to be fixed thereto, and thereby, it is possible to easily attach with few procedures. In addition, furthermore, since the disposition of the capillary is also supported, it is also possible to reduce the risk of damage.

Furthermore, in the present embodiment, since the capillary is in direct contact with a member with high thermal conductivity, heat generated from the capillary can be dissipated by applying a high voltage at the time of electrophoresis. Thereby, since temperature inside the capillary is stabilized at a predetermined temperature, it is possible to improve analysis performance of the electrophoresis apparatus and to reduce the analysis time.

Embodiment 2

Example 2 is an embodiment of a capillary cartridge in which a shape of the heat dissipation body of the capillary cartridge is a planar shape corresponding to a region where the capillary creeps on the support body. As illustrated in FIG. 13, while the minimum amount of heat to dissipate the heat of the capillary is maintained, a region of the heat dissipation body 04 is limited so as to conform to the shape of the capillary, and thereby, it is possible to reduce a cost of the capillary cartridge while the heat dissipation performance is maintained. For example, it is possible to obtain a heat dissipation performance of 200 W/m²·K or more, even in a state where the heat dissipation body 04 is disposed only in the peripheral portion of the capillary 02 illustrated in FIG. 5 and the amount of heat is reduced to 50 J/K. Also in the present figure, since the heat dissipation body 04 is disposed on the back side of the support body 03, the heat dissipation body is indicated by a dotted frame. The heat dissipation body 04 may be attached to the support body 03 by joining a sheet of simple shape such as a rectangle. Furthermore, a shape of the support body 03 may be smaller in accordance with a shape of the heat dissipation body 04, such that the cost can be further reduced.

Embodiment 3

Embodiment 3 is an embodiment of a capillary cartridge configured to separately fix a detection unit and an electrode holder. The electrode holder is fixed by making an electrode holder positioning pin on an apparatus side pass through an electrode holder positioning hole as in the first embodiment. Meanwhile, as illustrated in FIG. 14, the detection unit 06 is configured to be connected to the support body 03 by an S-shaped detection unit holding member 54, and thereby, a location can be flexibly moved, matched, and fixed in a planar view. According to the present embodiment, an attaching operation can be performed more simply.

Embodiment 4

Embodiment 4 is an embodiment of providing a hand holding hole functioning as a grip portion is provided in the support body instead of a handle of the capillary cartridge. As illustrated in FIG. 15, as a user inserts his/her finger into a hand holding hole 55 of the support body 03 and holds to operate the capillary cartridge 01, it is possible to reduce a risk of dropping at the time of carrying or attaching. In addition, by disposing the hand holding hole 55 near the detection unit, positioning can be easily performed. Alternatively, by disposing the hand holding hole 55 in a well-balanced state near the center portion, the force applied at the time of detachment is dispersed without concentrating at one place, deformation or distortion of the support body 03 can be prevented, and efficiency of attachment work and detachment work can be increased.

Embodiment 5

Embodiment 5 is an embodiment in which the support body of the capillary cartridge has a two-stage structure. As illustrated in FIG. 16, the two-stage structure is provided in which a push plate 57 is attached to the back side of the support body 03 to which the heat dissipation body 04 is attached and one or more push plate springs 56 are inserted between the support body 03 and the push plate 57, the capillary cartridge itself can have a cushion property. In a case of the present embodiment, there is no need to form the thermostatic bath door 43 described in Embodiment 1 as the two-stage structure.

As described in detail above, according to the present invention, since temperature increase inside the capillary can be suppressed by the heat dissipation body, it is possible to perform electrophoresis under a high voltage application condition where the amount of heat increases and to reduce the analysis time. In addition, it is possible to redress complexity of an operation by reducing the number of fixing places at the time of attachment by adopting a structure in which the capillary and the support body are integrated. Thereby, it is possible to achieve both improvement of analysis performance and improvement of usability.

The present invention is not limited to the above-described embodiments, and includes various modification examples. For example, the above-described embodiments are described in detail for a better understanding of the present invention, and are not necessarily limited to those having all the configurations of the description. In addition, it is possible to perform addition, deletion, and replacement of other configurations with respect to a part of a configuration of each embodiment. For example, it is also possible to form a detection unit positioning hole on an attachment surface on a thermostatic bath unit side of an electrophoresis apparatus, and to provide a detection unit positioning pin pushing structure formed in the support body. In addition, it is possible to replace a part of a configuration of one embodiment with a configuration of another embodiment, and to add a configuration of another embodiment to a configuration of one embodiment.

REFERENCE SIGNS LIST

01: capillary cartridge, 02: capillary, 03: support body, 04: heat dissipation body, 05: electrode holder, 06: detection unit, 07: capillary head, 08: electrode (cathode), 09: handle, 10: electrode holder fixing pin, 11: electrode holder fixing hole, 12: detection unit fixing frame, 13: detection unit positioning pin, 14: positioning hole, 15: electrode holder positioning pin, 16: electrode holder positioning hole, 20: autosampler unit, 21: sampler base, 22: X-axis drive body, 23: Y-axis drive body, 24: Z-axis drive body, 25: sample tray, 26: sample container, 27: liquid feeding mechanism, 28: electrophoresis medium container, 29: anode side buffer liquid container, 30: anode side wash layer, 31: anode side electrophoresis buffer liquid layer, 32: anode side sample introduction buffer liquid layer, 33: cathode side buffer liquid container, 34: waste liquid layer, 35: cathode side wash layer, 36: cathode side electrophoresis buffer liquid layer, 40: irradiation detection/thermostatic bath unit, 41: thermostatic bath unit 42: irradiation detection unit, 43: thermostatic bath door, 44: electrode (anode), 50: attachment surface, 52: clip, 53: spring, 54: detection unit holding member, 55: hand holding hole, 56: push plate spring, 57: push plate, 58: door support body

The invention claimed is:

1. An electrophoresis apparatus comprising:
   a capillary cartridge having:
     a capillary array having a capillary, a capillary head that is provided one end of the capillary, an electrode that is provided in another end of the capillary, and a detection unit that is provided in a part of the capillary; and
     a support body that supports the capillary; and
   a thermostatic chamber that holds the capillary at a predetermined temperature,
   wherein the thermostatic chamber has a positioning pin that positions the capillary cartridge in the thermostatic chamber,
   wherein the capillary cartridge has a positioning hole in which the positioning pin is inserted,
   wherein, by inserting the positioning pin to the positioning hole, the capillary cartridge is positioned in the thermostatic chamber, and
   wherein a mounting surface of the thermostatic chamber has a clip comprising an elastic body and a strut to fix the elastic body, and the clip holds the detection unit by the reaction force of the elastic body.

2. The electrophoresis apparatus according to claim 1,
   wherein the capillary array has an electrode holder that holds the electrode,
   wherein the positioning pin and the positioning hole perform the positioning of the electrode holder,
   wherein the thermostatic chamber has the positioning pin protruding to a capillary cartridge side,
   wherein the capillary cartridge has a positioning hole in which the positioning pin is to be inserted, and
   wherein the positioning pin is in a tapered shape which is inclined so that a cross-sectional area of the positioning pin is reduced from a thermostatic chamber side toward the capillary cartridge.

3. The electrophoresis apparatus according to claim 2, further comprising:
   an irradiation-detection unit that irradiates and detects light during electrophoresis using the capillary,
   wherein the detection unit is movable in a planar direction and connectable to the support body by connecting the capillary with a detection unit holding member provided in the support body.

4. The electrophoresis apparatus according to claim 2,
   wherein the positioning pin has:
   a detection unit positioning pin that positions the detection unit and the electrode holder, respectively; and
   an electrode holder positioning pin, and
   wherein the positioning hole has:
   a detection unit positioning hole to position the detection unit; and
   an electrode holder positioning hole.

5. The electrophoresis apparatus according to claim 1,
   wherein the clip has a protrusion at a tip of the clip and holds the detection unit by the protrusion.

6. The electrophoresis apparatus according to claim 2,
   wherein a distance from a fixed portion of the detection unit to a fixed portion of the capillary head is shorter than a capillary length from the detection unit to the capillary head, and
   wherein the detection unit and the capillary head are fixed by aligning a height of the capillary head and the electrode.

7. The electrophoresis apparatus according to claim 1,
   wherein the thermostatic chamber has a thermostatic chamber door,
   wherein the capillary cartridge is fixed to the thermostatic chamber by the thermostatic chamber door, and
   wherein the thermostatic chamber door has a two-stage structure sandwiching the elastic body.

8. The electrophoresis apparatus according to claim 1,
   wherein the thermostatic chamber has a thermostatic chamber door,
   wherein, by the thermostatic chamber door pressing the capillary cartridge, the capillary cartridge is fixed to the thermostatic chamber by the thermostatic chamber door, and
   wherein the support body has a two-stage structure sandwiching the elastic body.

9. The electrophoresis apparatus according to claim 1, further comprising:
   a sheet having a cushioning property and being provided between the support body and the capillary array.

10. An electrophoresis apparatus comprising:
    a capillary cartridge having:
      a capillary array having a capillary, a capillary head that is provided one end of the capillary, an electrode that is provided in another end of the capillary, and a detection unit that is provided in a part of the capillary; and
      a support body that supports the capillary; and
    a thermostatic chamber that holds the capillary at a predetermined temperature,
    wherein the capillary cartridge has a positioning pin that positions the capillary cartridge in the thermostatic chamber, wherein the thermostatic chamber has a positioning hole in which the positioning pin is inserted, wherein, by inserting the positioning pin to the positioning hole, the capillary cartridge is positioned in the thermostatic chamber, and wherein a mounting surface of the thermostatic chamber has a clip comprising an elastic body and a strut to fix the elastic body, and the clip holds the detection unit by the reaction force of the elastic body.

* * * * *